United States Patent
Wintemute et al.

(10) Patent No.: US 10,517,206 B2
(45) Date of Patent: Dec. 31, 2019

(54) SYSTEM FOR PROVIDING PRESCRIPTIVE APPLICATION OF MULTIPLE PRODUCTS

(71) Applicant: AMVAC Chemical Corporation, Newport Beach, CA (US)

(72) Inventors: Eric G. Wintemute, Newport Beach, CA (US); John J. Richardson, Jacksonville, IL (US); Richard L. Rice, Collierville, TN (US); Larry M. Conrad, Walker, IA (US); Rex A. Rysdam, Bloomfield, IA (US); Nathaniel R. Claussen, Golden Valley, MN (US); Richard M. Porter, Ankeny, IA (US)

(73) Assignee: AMVAC CHEMICAL CORPORATION, Newport Beach, CA (US)

(*) Notice: Subject to any disclaimer, the term of this patent is extended or adjusted under 35 U.S.C. 154(b) by 25 days.

(21) Appl. No.: 15/614,547

(22) Filed: Jun. 5, 2017

(65) Prior Publication Data
US 2017/0265374 A1 Sep. 21, 2017

Related U.S. Application Data

(63) Continuation-in-part of application No. 14/521,908, filed on Oct. 23, 2014, now Pat. No. 9,820,431, which
(Continued)

(51) Int. Cl.
*A01C 23/00* (2006.01)
*A01C 21/00* (2006.01)
(Continued)

(52) U.S. Cl.
CPC .......... *A01C 23/007* (2013.01); *A01C 21/005* (2013.01); *A01M 7/0089* (2013.01);
(Continued)

(58) Field of Classification Search
CPC ....... A01C 7/102; A01C 21/005; A01C 23/00; A01C 23/007; A01M 9/0092; A01M 7/0089
See application file for complete search history.

(56) References Cited

U.S. PATENT DOCUMENTS

| 113,591 A | 4/1871 | Spooner |
| 317,988 A | 5/1885 | Gibbon |

(Continued)

FOREIGN PATENT DOCUMENTS

| WO | 2011025592 A1 | 3/2011 |
| WO | 2013191990 A2 | 12/2013 |

(Continued)

OTHER PUBLICATIONS

Screenshot from http://www.amvacsmartbox.com/AboutSmartBoxiAboulSmartBoxilabid/I03/Default.aspx ,downloaded on Sep. 23, 2016 (1 Page).
(Continued)

*Primary Examiner* — Alicia Torres
(74) *Attorney, Agent, or Firm* — Lawrence N. Ginsberg (57) ABSTRACT

A system for dispensing crop input products from multiple meters per crop row, including: a) a georeferencing module configured to receive and process georeferenced location information; b) a prescriptive control module configured to receive the processed georeferenced location information from the georeferencing module and utilize the georeferenced location information to generate specific prescriptive rate information for individual meters in the field; and, c) a meter controller module operatively connected to the prescriptive control module. The meter controller module is configured to utilize the specific prescriptive rate information to individually control multiple meters per crop row, to simultaneously dispense crop input products at specific prescriptive rates at georeferenced locations throughout the field.

11 Claims, 10 Drawing Sheets

Related U.S. Application Data is a continuation-in-part of application No. 14/468,973, filed on Aug. 26, 2014, now abandoned.

(60) Provisional application No. 61/870,667, filed on Aug. 27, 2013, provisional application No. 62/346,377, filed on Jun. 6, 2016.

(51) Int. Cl.

| | | |
|---|---|---|
| *A01M 7/00* | (2006.01) | |
| *G06K 7/10* | (2006.01) | |
| *A01M 99/00* | (2006.01) | |
| *A01M 9/00* | (2006.01) | |
| *A01C 7/06* | (2006.01) | |

(52) U.S. Cl.
CPC ........ *A01M 7/0092* (2013.01); *A01M 9/0092* (2013.01); *A01M 99/00* (2013.01); *G06K 7/10366* (2013.01); *A01C 7/06* (2013.01)

(56) References Cited

U.S. PATENT DOCUMENTS

| | | |
|---|---|---|
| 469,999 A | 3/1892 | Hoos |
| 600,629 A | 3/1898 | Levi |
| 781,693 A | 2/1905 | Tandy |
| 825,263 A | 7/1906 | Jameson et al. |
| 861,355 A | 7/1907 | Brower |
| 868,300 A | 10/1907 | Sohner et al. |
| 924,099 A | 6/1909 | Nelson |
| 931,882 A | 8/1909 | Martin |
| 4,009,668 A | 3/1977 | Brass et al. |
| 4,497,265 A | 2/1985 | Hood et al. |
| 4,521,908 A | 6/1985 | Miyaji et al. |
| 4,522,340 A | 6/1985 | Gandrud |
| 4,529,073 A | 7/1985 | Lewis |
| 4,611,606 A | 9/1986 | Hall et al. |
| 4,691,645 A | 9/1987 | Anderson |
| 4,705,220 A | 11/1987 | Gandrud et al. |
| 4,896,615 A | 1/1990 | Hood, Jr. et al. |
| 4,917,304 A | 4/1990 | Mazzei et al. |
| 4,971,255 A | 11/1990 | Conrad |
| 5,024,173 A | 6/1991 | Deckler |
| 5,029,624 A | 7/1991 | McCunn et al. |
| 5,060,701 A | 10/1991 | McCunn et al. |
| 5,125,438 A | 6/1992 | McCunn et al. |
| 5,220,876 A | 6/1993 | Monson et al. |
| 5,224,577 A | 7/1993 | Falck et al. |
| 5,301,848 A | 4/1994 | Conrad et al. |
| 5,379,812 A | 1/1995 | McCunn et al. |
| 5,524,794 A | 6/1996 | Benedetti, Jr. et al. |
| 5,539,669 A | 7/1996 | Goeckner et al. |
| 5,638,285 A | 6/1997 | Newton |
| 5,641,011 A | 6/1997 | Benedetti, Jr. et al. |
| 5,687,782 A | 11/1997 | Cleveland et al. |
| 5,737,221 A | 4/1998 | Newton |
| 5,931,882 A | 8/1999 | Fick et al. |
| 6,070,539 A * | 6/2000 | Flamme ............... A01B 79/005 111/177 |
| 6,122,581 A | 9/2000 | McQuinn |
| 6,198,986 B1 | 3/2001 | McQuinn |
| 6,216,615 B1 | 4/2001 | Romans |
| 6,289,829 B1 | 9/2001 | Fish et al. |
| 6,748,884 B1 | 6/2004 | Bettin et al. |
| 6,938,564 B2 | 9/2005 | Conrad et al. |
| 7,171,912 B2 | 2/2007 | Fraisse et al. |
| 7,171,913 B1 | 2/2007 | Conrad |
| 7,270,065 B2 | 9/2007 | Conrad |
| 7,317,988 B2 | 1/2008 | Johnson |
| 7,380,733 B2 | 6/2008 | Owenby et al. |
| 7,694,638 B1 | 4/2010 | Riewerts et al. |
| 7,916,022 B2 | 3/2011 | Wilcox et al. |
| 8,024,074 B2 | 9/2011 | Stelford et al. |
| 8,141,504 B2 | 3/2012 | Dean et al. |
| 8,322,293 B2 | 12/2012 | Wollenhaupt et al. |
| 8,336,470 B2 | 12/2012 | Rans |
| 8,371,239 B2 | 2/2013 | Rans et al. |
| 8,371,240 B2 | 2/2013 | Wollenhaupt et al. |
| 8,504,234 B2 | 8/2013 | Anderson |
| 8,504,310 B2 | 8/2013 | Landphair et al. |
| 8,517,230 B2 | 8/2013 | Memory |
| 8,600,629 B2 | 12/2013 | Zielke |
| 8,781,693 B2 | 7/2014 | Woodcock |
| 8,825,263 B1 | 9/2014 | Nelson, Jr. |
| 8,868,300 B2 | 10/2014 | Kocer et al. |
| 8,924,099 B2 | 12/2014 | Nelson, Jr. |
| 9,113,591 B2 | 8/2015 | Shivak |
| 2003/0226484 A1 | 12/2003 | O'neall et al. |
| 2004/0231575 A1 | 11/2004 | Wilkerson et al. |
| 2007/0193483 A1 | 8/2007 | Conrad |
| 2007/0266917 A1 | 11/2007 | Riewerts et al. |
| 2010/0101466 A1 | 4/2010 | Riewerts et al. |
| 2010/0282141 A1 | 11/2010 | Wollenhaupt et al. |
| 2010/0282143 A1 | 11/2010 | Preheim et al. |
| 2010/0282144 A1 | 11/2010 | Rans et al. |
| 2010/0282147 A1 | 11/2010 | Wollenhaupt et al. |
| 2011/0035055 A1 | 2/2011 | Applegate et al. |
| 2011/0054743 A1 | 3/2011 | Kocer et al. |
| 2011/0174893 A1 * | 7/2011 | Allan .................. A01C 15/122 239/8 |
| 2012/0010789 A1 | 1/2012 | Dulnigg |
| 2012/0016517 A1 * | 1/2012 | Holland ............... A01B 79/005 700/225 |
| 2012/0042815 A1 | 2/2012 | Wonderlich |
| 2013/0061789 A1 | 3/2013 | Binsirawanich et al. |
| 2013/0061790 A1 | 3/2013 | Binsirawanich et al. |
| 2013/0085598 A1 | 4/2013 | Kowalchuk |
| 2013/0152835 A1 | 6/2013 | Stevenson et al. |
| 2013/0192503 A1 | 8/2013 | Henry et al. |
| 2014/0026792 A1 | 1/2014 | Bassett |
| 2014/0183182 A1 | 7/2014 | Oh et al. |
| 2014/0252111 A1 | 9/2014 | Michael et al. |
| 2014/0263705 A1 | 9/2014 | Michael et al. |
| 2014/0263708 A1 | 9/2014 | Thompson et al. |
| 2014/0263709 A1 | 9/2014 | Kocer et al. |
| 2014/0277780 A1 | 9/2014 | Jensen et al. |
| 2014/0284400 A1 | 9/2014 | Hebbert et al. |
| 2014/0345340 A1 * | 11/2014 | Holland ................ A01C 21/00 71/1 |
| 2015/0094916 A1 | 4/2015 | Bauerer et al. |
| 2015/0097707 A1 | 4/2015 | Nelson, Jr. et al. |
| 2015/0195988 A1 | 7/2015 | Radtke et al. |
| 2015/0334912 A1 | 11/2015 | Sauder et al. |

FOREIGN PATENT DOCUMENTS

| | | |
|---|---|---|
| WO | 2014018717 A1 | 1/2014 |
| WO | 2013191990 A3 | 2/2014 |
| WO | 2015061570 A1 | 4/2015 |

OTHER PUBLICATIONS

Screenshot from http://www.amvacsmartbox.com/Portals/0/Guides/DropTubes/Drop%20Tube%20-%20John%20Deer%20-%20Reart%20Mount.PD, downloaded on Jul. 13, 2017 (1 Page).

European Application No. EP-14 85 5768.9, European Extended Search Report and Written Opinion of the European Searching Authority dated May 10, 2017 Attached to Pursuant to Rule 62 EPC and Cited References (92 Pages).

European Application No. EP- 19 15 2958, European Search Report and the European Seach Dpinion of the European Searching Authority dated May 28, 2019 (17 Pages).

* cited by examiner

SYSTEM FOR PROVIDING PRESCRIPTIVE APPLICATION OF MULTIPLE PRODUCTS

CROSS REFERENCE TO RELATED APPLICATIONS

The present application claims benefits of U.S. Provisional Application No. 62/346,377 filed Jun. 6, 2016, entitled SYSTEM FOR PROVIDING PRESCRIPTIVE APPLICATION OF MULTIPLE PRODUCTS, and is a continuation in part of U.S. application Ser. No. 14/521,908, filed on Oct. 23, 2014, now U.S. Pat. No. 9,820,431, entitled SYSTEM AND PROCESS FOR DISPENSING MULTIPLE AND LOW RATE AGRICULTURAL PRODUCTS.

U.S. application Ser. No. 14/521,908 is a continuation in part of U.S. application Ser. No. 14/468,973, filed Aug. 26, 2014, entitled SYSTEM FOR DISPENSING AGRICULTURAL PRODUCTS IN SPECIFIED GROUPINGS, which claims benefits of U.S. Provisional Application No. 61/870,667 filed Aug. 27, 2013, and claims benefist of U.S. Provisional Application No. 61/895,803 filed Oct. 25, 2013.

This patent application claims the benefit of U.S. Provisional Application. No. 61/870,667 filed Aug. 27, 2013, entitled SYSTEM FOR DISPENSING AGRICULTURAL PRODUCTS IN SPECIFIED GROUPINGS.

This patent application also claims the benefit of U.S. Provisional Application. No. 61/895,803, filed Oct. 25, 2013, entitled SYSTEM FOR DISPENSING MULTIPLE AGRICULTURAL PRODUCTS AT PLANTING.

This patent application also claims the benefit of U.S. Provisional Application. No. 62/048,628, filed Sep. 10, 2014, entitled SYSTEM AND PROCESS FOR DISPENSING AGRICULTURAL PRODUCTS AT A LOW RATE.

This patent application also claims the benefit of U.S. Provisional Application. No. 62/346,377, filed Jun. 6, 2016, entitled SYSTEM FOR PROVIDING PRESCRIPTIVE APPLICATION OF MULTIPLE PRODUCTS.

The entire contents of 62/346,337, 14/521,908, 14/468,973, 61/870,667, and 61/895,803, are each hereby incorporated by reference.

BACKGROUND OF THE INVENTION

1. Field of the Invention

The present invention relates generally to material delivery systems for agricultural products, including fertilizers, nutrients, crop protection chemicals, biologicals, and plant growth regulators; and, more particularly to a material dispensing system that simultaneously dispenses crop input products at specific prescriptive rates at georeferenced locations throughout the field.

2. Description of the Related Art

In markets requiring the usage of chemicals, often hazardous substances, the Environmental Protection Agency and other regulatory bodies are imposing stricter regulations on the transportation, handling, dispersion, disposal, and reporting of actual usage of chemicals. These regulations, along with public health concerns, have generated a need for products that address these issues dealing with proper chemical handling.

To reduce the quantity of chemicals handled, the concentration of the chemical, as applied, has been increasing. This has raised the cost of chemicals per unit weight and has also required more accurate dispensing systems. For example, typical existing systems for agricultural product dispensing use a mechanical chain driven dispenser. Normal wear and tear on these mechanical dispensers can alter the rate of product applied by as much as 15%. For one typical chemical insecticide, Aztec®, by AMVAC Chemical Corporation, an over-application rate of 15% can increase the cost of the insecticide by $1500 over 500 acres and may contribute or cause unwanted crop response, such as plant phytotoxicity or unregistered amounts of pesticide residues in or on the crop.

Since many of the current agricultural product systems are mechanical systems, any record keeping and reporting must generally be kept manually.

The foregoing illustrates limitations known to exist in many present material delivery systems. Thus, it is apparent that it would be advantageous to provide an alternative directed to overcoming one or more of the limitations set forth above. Accordingly, a suitable alternative is provided, including features more fully disclosed hereinafter.

Over the past decade, planting and chemical dispensing systems for dispensing seed and insecticides, herbicides, fungicides, nutrients, plant growth regulators, or fertilizers, have made the handling of seed and chemical liquids or granules less hazardous to the agricultural worker by providing closed container systems, such as those described in U.S. Pat. Nos. 5,301,848 and 4,971,255, incorporated by reference herein and the SmartBox® Dispensing System (hereinafter "SmartBox Dispensing System"), marketed by AMVAC Chemical Corporation, a division of American Vanguard Corporation. Briefly, as described in U.S. Pat. No. 5,301,848, access to and from a container in a closed container system is available through a single opening in the bottom wall of the container, offering distinct advantages over an open-top, non-removable container design in an open container system.

Closed container systems provide a removable container, which is pre-filled with the chemical or toxic materials such as insecticides, fertilizers, herbicides and other pesticides; or other agricultural products, thereby eliminating the need to open and pour bags of chemical products into storage hoppers. Since the closed container system is largely not open to the air, agricultural workers have less opportunity to come into contact with the chemical products, thereby reducing skin and inhalation exposure to the hazardous chemicals.

Currently, there is an industry program to double corn yields in 20 years through use of new technology. At the present time, most products that are applied at planting are insecticides for the treatment of nematodes, and soil insects, such as corn rootworm, and secondary insect pests; herbicides for the control of weeds in the seed zone; fungicides for the control of diseases and improving plant health; nutrients for improving plant health, etc. There is research being conducted for other products such as biological products, fertility products, fungicides, micro-nutrients, growth stimulants, the new area of RNA silencing or interference gene technology, etc.

Today, most granular products for pest control at planting time are dispensed at a rate above three ounces per thousand feet of row. Bigger planters and distribution issues make it desirable for a more concentrated product to be applied at lower rates. Because of application issues, special techniques and special equipment are required to provide proper application so these granular products can perform effectively. As will be disclosed below, the present invention addresses these needs.

Conventional systems, for granule placement in-furrow, use a plastic hose and metal bracket. Wind and side hills may affect product placement. Because they are placed behind the depth wheels the brackets are constantly being misaligned by coming into contact with crop residue, clods, and other field issues such as ditches and furrows. Also, since the furrow closure is determined by soil conditions, the furrow may be closed by the time the chemical tube applies the chemical to the furrow. Normally product is placed behind the depth wheels in such a manner that the wind can blow the product off target under windy conditions prevalent during planting time. With conventional banding equipment, the product is placed on the downhill side of the row on side hills. OEM banding equipment is often times too wide and offers no protection from the wind, which may not let the product be placed in the desired application zone.

SUMMARY OF THE INVENTION

In one aspect, the present invention is embodied as a system for dispensing crop input products from multiple meters per crop row, including: a) a georeferencing module configured to receive and process georeferenced location information; b) a prescriptive control module configured to receive the processed georeferenced location information from the georeferencing module and utilize the georeferenced location information to generate specific prescriptive rate information for individual meters in the field; and, c) a meter controller module operatively connected to the prescriptive control module. The meter controller module is configured to utilize the specific prescriptive rate information to individually control multiple meters per crop row, to simultaneously dispense crop input products at specific prescriptive rates at georeferenced locations throughout the field.

In another aspect, the present invention is embodied as a system for dispensing soil input products from multiple meters in a soil area. A georeferencing module is configured to receive and process georeferenced location information. A prescriptive control module is configured to receive the processed georeferenced location information from the georeferencing module and utilize the georeferenced location information to generate specific prescriptive rate information for individual meters in the soil area. A meter controller module is operatively connected to the prescriptive control module, configured to utilize the specific prescriptive rate information to individually control multiple meters of a group of meters in a soil area, to simultaneously dispense soil input products at specific prescriptive rates at georeferenced locations throughout the soil area.

Various combinations of products at planting with multiple containers can be applied with this technology.

DETAILED DESCRIPTION OF THE INVENTION

Figure 1:
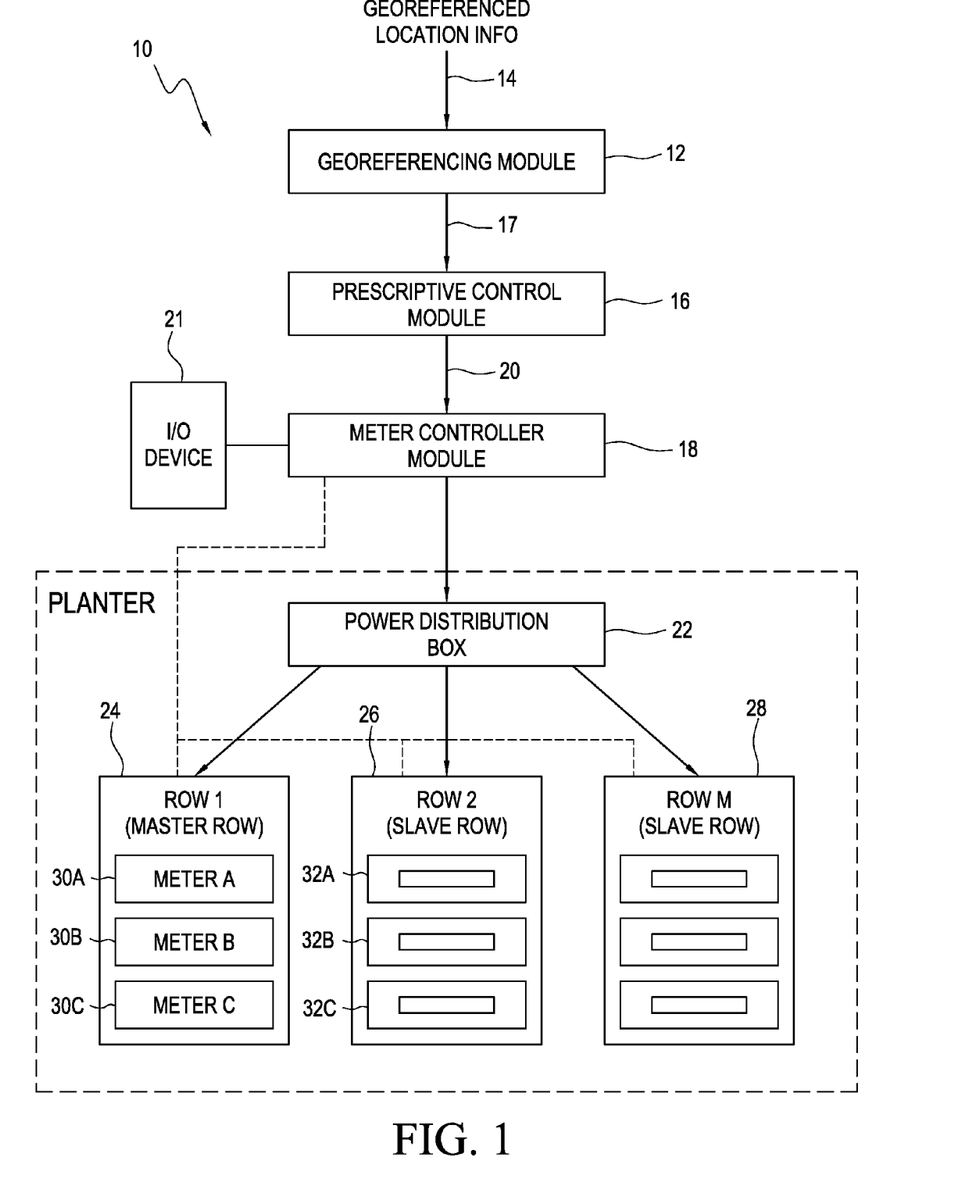
FIG. 1 is a schematic illustration of the system for dispensing crop input products from multiple meters per crop row of the present invention.

Referring now to the drawings and the characters of reference marked thereon, FIG. 1 illustrates a preferred embodiment of the system for dispensing crop input products from multiple meters per crop row, designated generally as 10. A georeferencing module 12 is configured to receive and process georeferenced location information 14. A prescriptive control module 16 is configured to receive the processed georeferenced location information 17 from the georeferencing module and utilize the georeferenced location information to generate specific prescriptive rate information for individual meters in the field. A meter controller module 18 is operatively connected to the prescriptive control module. The meter controller module 18 is configured to utilize the specific prescriptive rate information 20 to individually control multiple meters per crop row, to simultaneously dispense crop input products at specific prescriptive rates at georeferenced locations throughout the field.

The georeferenced location information 14 is typically from GPS signals. The georeferencing module 12 is typically a combination of hardware and software. An antenna receives the georeferenced location information.

The georeferencing module 12, prescriptive control module 16, and meter controller module 18 are typically positioned on a tractor but alternatively may be positioned on a planter. The meter controller module is configured to control meters which may be dry meters for dispensing dry crop input products, liquid meters for dispensing liquid crop input products, and/or combinations of dry and liquid meters. In accordance with the invention the meters are simultaneously controlled.

The meter controller module 18 is operatively connected, typically by blue tooth or the like, to an input/output device 21, such as an IPad or other type of tablet device. In some embodiments, the input/output device 21 is wholly integrated within the meter controller module 18. In some embodiments the prescriptive control module might be within the meter controller module.

The planter includes a power distribution box 22 that redistributes electrical current from the tractor electrical system to the meters.

Figure 2:
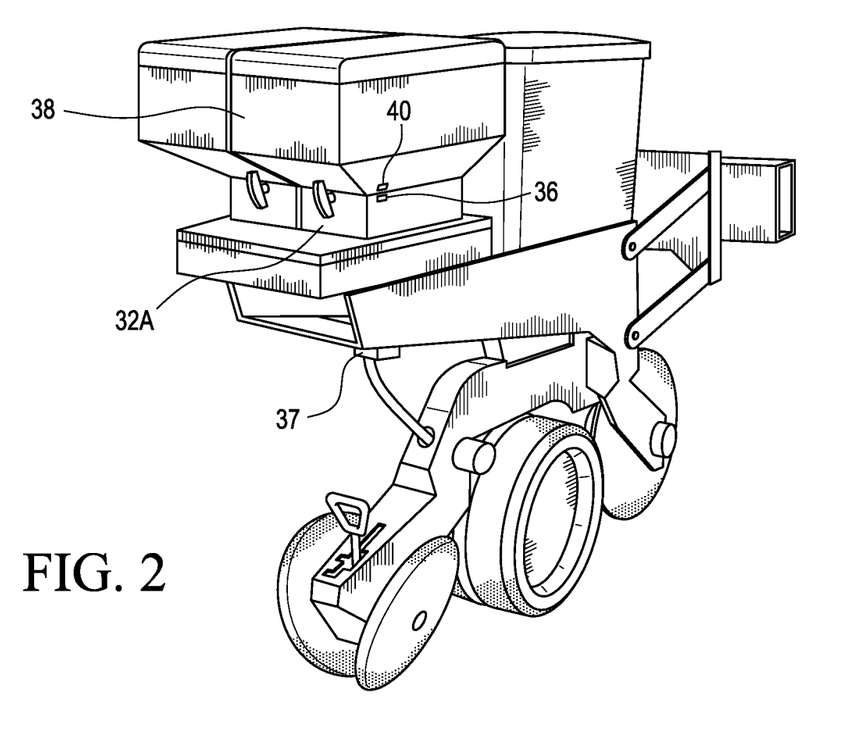
FIG. 2 is a perspective illustration of a planter row unit with side-by-side containers, in a rear mounted position, and with an RFID tag and RFID reader, in accordance with the principles of the present invention.

In a preferred embodiment, the planter contains a master row 24 and a plurality of slave rows, i.e. 26, 28, etc. The master row 24 has a plurality of master receptacles 30A, 30B, 30C, etc. The plurality of slave rows 26, 28, etc. has a plurality of slave receptacles 32A, 32B, 32C, etc. As can be seen in FIG. 2, each of the receptacles, master receptacles and slave receptacles alike, have an RFID tag reading device 36 connected thereto. Each RFID tag reading device 36 is operably connected to the meter controller module 18, and each RFID tag reading device 36 is operatively connectable to an RFID-tagged crop input product container 38 bearing a RFID tag 40. A meter is labeled by numeral designation 37.

In one embodiment, in the event a crop input product container is inserted into a slave receptacle, and the RFID tag information of that inserted crop input product container does not conform to the RFID tag information associated with a corresponding master receptacle to that slave receptacle, then the meter control module will disallow application of the crop input product and will notify the human operator via an error message on the graphical user interface of the input/output device 21 of the meter control module, that the inserted product container has been disallowed.

Thus, in an embodiment, when the operator installs a product container(s) into the MASTER ROW (e.g., Row #1) container receptacles, the RFID reader will read the product information from the RFID tag on the container and the product name will be displayed on the I/O device 21. If there are three container receptacles (A, B, & C) on the Master Row, the RFID reader will recognize the product installed into each receptacle. Following confirmation of the product installed into each receptacle on the Master Row, the system software will disallow the use of any other product in a corresponding receptacle (A, B, & C) on any other row.

In one embodiment, when application of the crop input product is disallowed, the meter controller module will not dispense crop input product from any of the other meters in the system until a correct product container is installed, or until that specific non-conforming crop input product container has been selectively disabled through the meter controller module by the human operator.

Thus, there may be this additional operator over-ride feature to allow for instances where a farmer has a specific reason to install unique product combinations on individual rows.

In other alternate embodiments, the human operator selects a product from a pre-populated list that is displayed on the I/O device, i.e. iPad. Such alternate embodiments are less desirable because they require "system updates" to ensure the pre-populated list coincides with all the products that can be applied with the system.

In some embodiments, the RFID tag informs the system of the net contents of each container. The system calculates and records on an on-going/constant basis, the quantity of product that has been removed from each container. (For example, with an auger meter system, the means of calculating the quantity of product removed is a function of the number of times the auger rotates and/or the number of times and the duration of time and the pressure, at which the liquid dispensing equipment is operated.) Once the system determines that the container for a given receptacle is empty, the system will disallow additional product to be dispensed from that receptacle. This will prevent operators from cutting a hole in the top of the product container for the purpose of applying a greater quantity of product through the container than was originally inserted into the container when it was filled by the product manufacturer.

Figure 3:
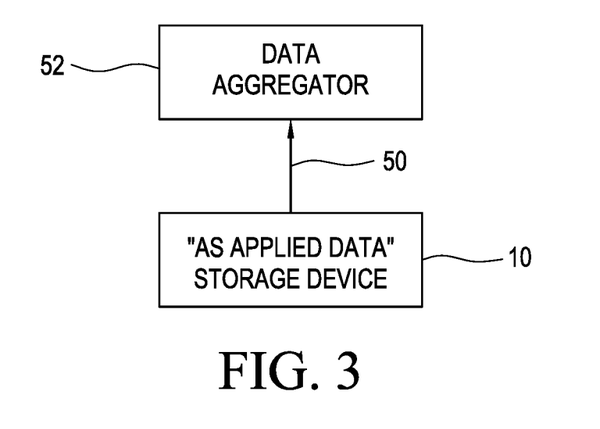
FIG. 3 illustrates use of a data aggregator, in accordance with the present invention.

Referring now to FIG. 3, when crop input product is put into a product container the contents are written to an RFID tag, and when the crop input product is dispensed, as-applied information 50 is recorded, and transmitted to a data aggregator 52. This data aggregation ensures that when multiple fields are treated by multiple operators with the same crop input, the as-applied information for that crop input is recorded in a consistent manner across all the fields so-treated. The benefit of doing so is that it simplifies data aggregation of all applications of a particular crop input product, obviating the requirement for a translator to put all the data into a uniform format, while also reducing the risk that some treatments are inadvertently omitted from the data aggregation as a consequence of a translator's failure to recognize a non-standard product name/code/means of identification.

Figure 4A:
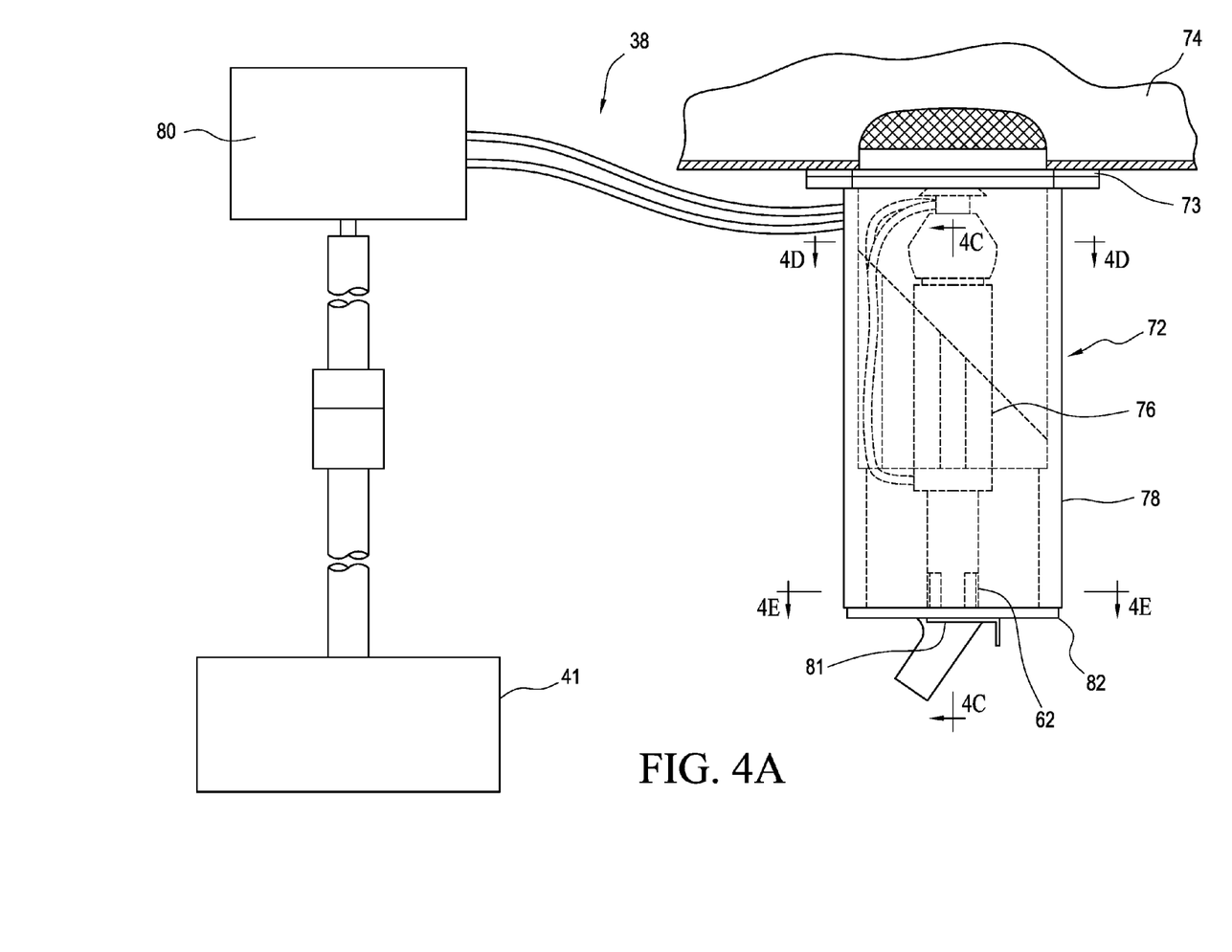
FIG. 4A illustrates one embodiment of a metering system and memory unit of the system for electronically pulsing chemical with seed.

FIG. 4A shows a side view of a crop input metering system, designated generally as 38. The meter system 38 includes a metering device 72 and memory unit 80. A base plate 73 is fastened to the bottom of the base container 74 or product container 14. The electromechanical metering device 72 is attached to the base plate 73. The metering device 72 shown in this figure uses an electric solenoid 76. The solenoid 76 is contained within a meter housing 78. The solenoid 76 is energized by electrical power from the power distribution box, with the electrical power being controlled by information from the meter controller module. When energized, the solenoid retracts the plunger away from the material dispensing aperture (not shown), thereby allowing product to flow by gravity out of the container 74.

The solenoid 76 must be sealed from the product. Product entering the solenoid 76 can cause its premature failure. The solenoid 76 is sealed by a cover to prevent entry of product into the solenoid 76.

An outlet aperture is on the bottom of the meter system 38. In the embodiment illustrated a removable calibrated orifice element 81 is disposed within the outlet aperture. The flow sensor 62 is configured to sense a greater flow rate at the inlet aperture than at the outlet aperture. An adjustment mechanism is configured to adjust the flow rate of the meter. A removable calibration orifice plate holder 82 may be used.

Figure 4B:
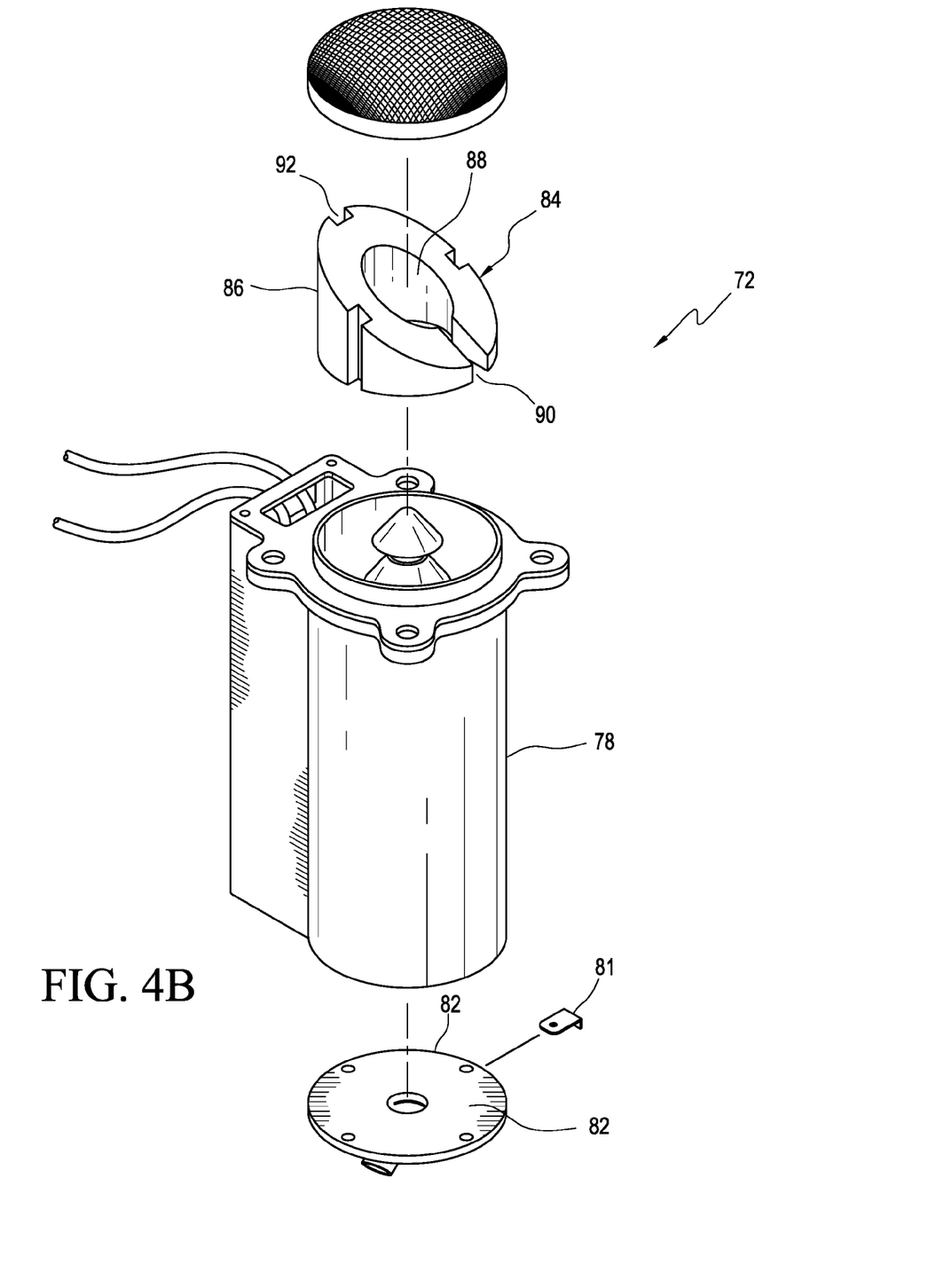
FIG. 4B is an exploded perspective view of an embodiment of a metering system using a solenoid and a single slope, wedge-type of in-meter diffuser.

As can be seen in FIG. 4B, the meter (or metering device) 72 may use a single slope, wedge-type in-meter diffuser 84. The in-meter diffuser 84 includes a main body 86 having a substantially circular cross-section, a sloped upper end and a lower end, and defining a longitudinal central axis thereof. The main body 86 includes a longitudinally disposed central opening 88 extending from the upper end to the lower end. The central opening 88 is configured to serve as a compartment for the solenoid 76 of the system for dispensing chemical granules. A primary exit opening 90 extends from the upper end to the lower end (for most of the material leaving under normal vertical operating conditions). A plurality of spaced extending cutaway portions 92 on an outer surface thereof define a plurality of secondary exit openings (in case the primary exit opening becomes plugged or operation on slopes, or going up and down hills).

Figures 4C, 4D, 4E:
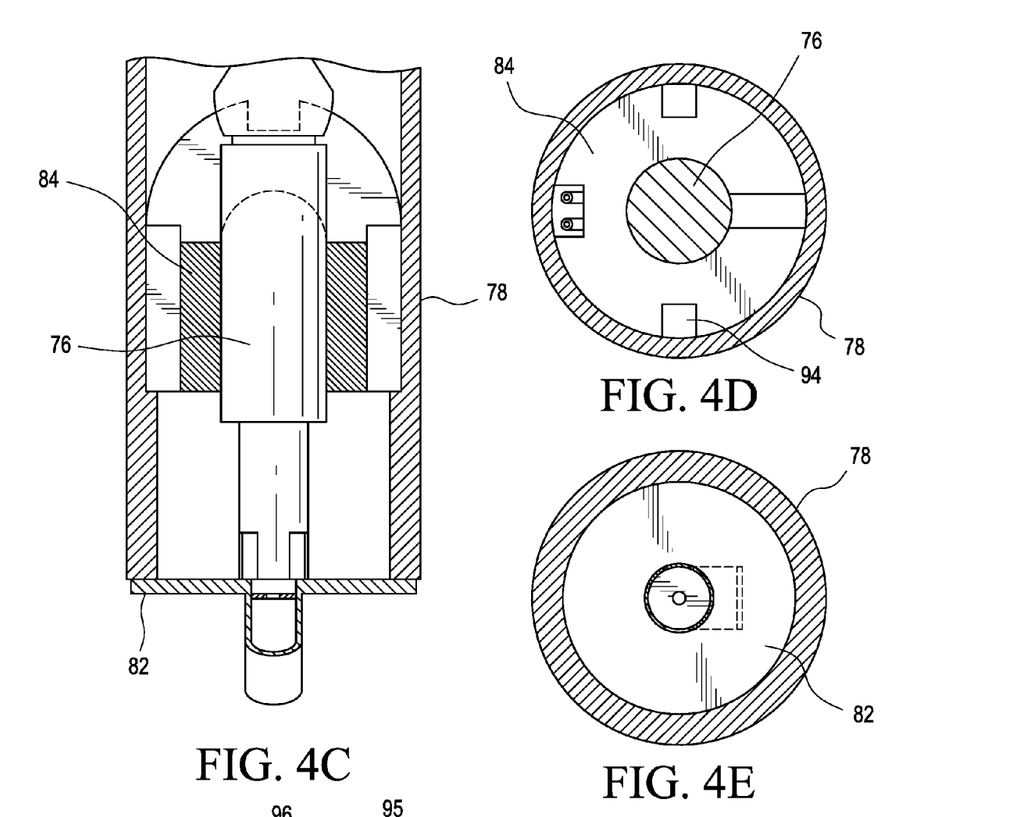
FIG. 4C is a longitudinal section, taken along lines 4C-4C of FIG. 4A.
FIG. 4D is a section taken along lines 4D-4D of FIG. 4A.
FIG. 4E is a section taken along lines 4E-4E of FIG. 4A.
Figure 4F:
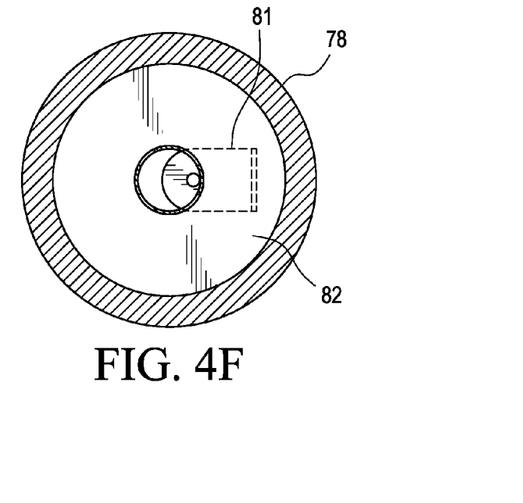
FIG. 4F shows the orifice plate partially opened.

FIG. 4C is a longitudinal section taken thru the diffuser 84 and solenoid and also showing a removable calibrated orifice element 81 and calibration orifice plate holder 82. The solenoid 76 is shown in full lines rather than in section. The diffuser 84 is in section and goes thru the two cutaway portions 94 which are shown on either side of the diffuser 84. FIG. 4D is a section looking down on the diffuser 84. The hatched circle in the middle is a simplified section of the solenoid 76. FIG. 4E is a section looking down on the removable calibrated orifice element 81 and calibration orifice plate holder 82. FIG. 4F is the same as FIG. 4E except with the orifice plate partially opened. Use of this removable calibrated orifice element 81 and calibration orifice plate holder 82 is not limited to a solenoid type metering device and may be used for other metering devices known in this field. Additionally, it may be used, for example, with the auger metering device described below.

Figure 4G:
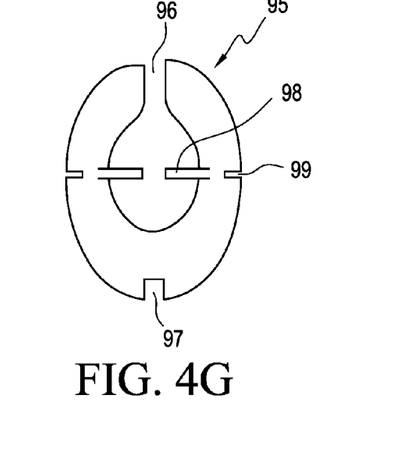
FIG. 4G shows another embodiment of the diffuser using a single plate.

Instead of being of a wedge-type the single slope in-meter diffuser may comprise a single plate. As shown in FIG. 4G a horseshoe shaped diffuser plate 95 is positioned to have a first, upper portion thereof proximate an upper end of the solenoid. The horseshoe shaped diffuser plate is positioned to be sloped relative to a longitudinal axis of the solenoid. The horseshoe shaped diffuser plate functions as a slide for some of the chemical granules being dispensed at the solenoid 76. A space 96 formed between two ends of the horseshoe shaped diffuser plate functions as an exit opening for the discharge of chemical granules. An overflow recess 97 is formed in the horseshoe shaped diffuser plate at the first, upper portion thereof. A pair of support tabs 98 extend from an inner surface of the horseshoe shaped diffuser plate. A pair of side wire openings 99 are on a surface of the horseshoe shaped diffuser plate. The tabs are bent during use to support the solenoid.

Figure 5A:
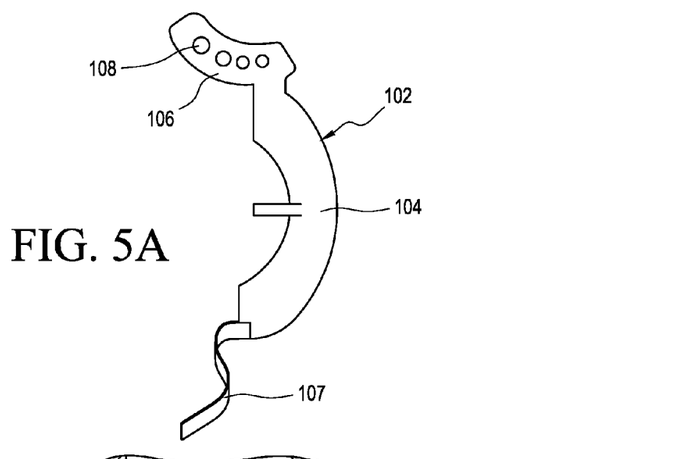
FIG. 5A is a view of one of the arcuate main diffuser plates used in a double slope in-meter diffuser assembly.
Figure 5B:
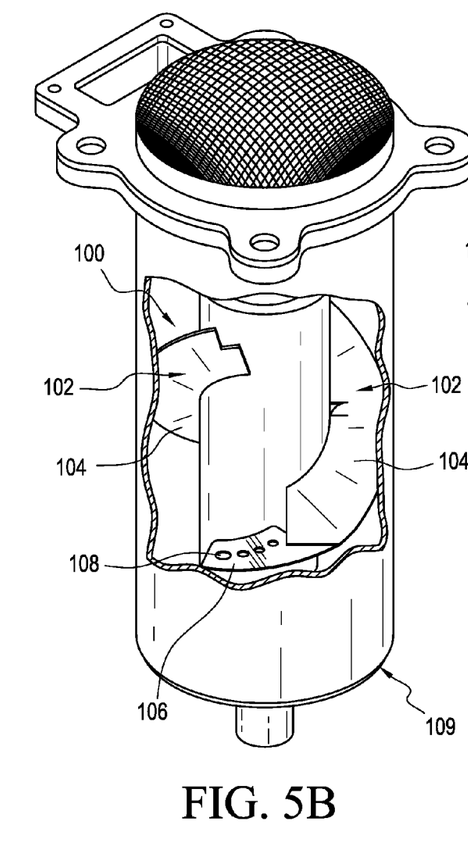
FIG. 5B is a perspective view, partially in cross section, of a double slope in-meter diffuser assembly installed in a metering system.
Figure 5C:
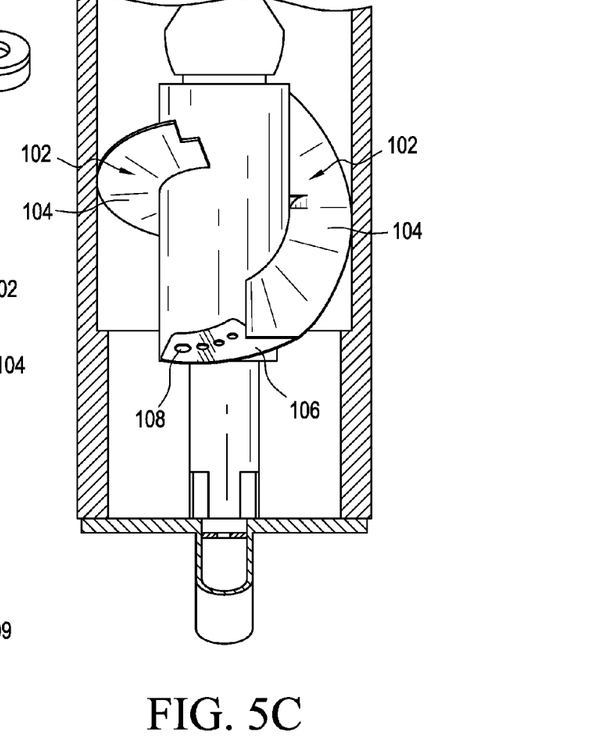
FIG. 5C shows the metering system of FIG. 5B partially in cross section.

Referring now to FIGS. 5A-5C, an embodiment of a meter is shown that includes a double slope in-meter diffuser assembly 100, i.e. one with a modified double helix design. The double slope in-meter diffuser assembly 100 includes a pair of diffuser elements 102, each diffuser element 102 comprising an arcuate main diffuser plate 104 positioned to have a first end thereof proximate an upper end of the solenoid. The arcuate main diffuser plate is positioned to be sloped relative to a longitudinal axis of the solenoid. The arcuate main diffuser plate functions as a slide for some of the chemical granules being dispensed at the solenoid. An orifice plate 106 depends from a lower end of the arcuate main diffuser plate. The orifice plate has at least one discharge opening 108 for discharging chemical granules from the in-meter diffuser assembly 109. A somewhat flexible strip 107 extends from the upper end of the arcuate main diffuser plate 104 to bias the diffuser element 102 against the meter body.

Figure 6:
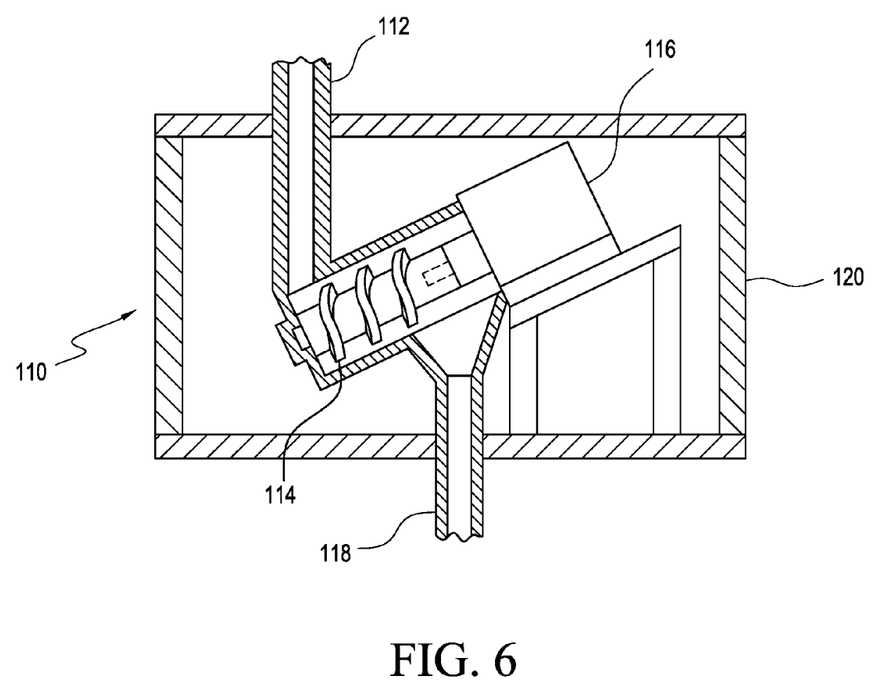
FIG. 6 is a schematic illustration of an inclined auger metering system.

Although the present invention has been discussed relative to solenoid type agricultural product metering systems other types of metering systems may be utilized in accordance with the principles of the present invention. For example, the agricultural product metering system may include an auger meter. FIG. 6 illustrates an inclined auger metering system 110 including an inlet 112 for agricultural product, an inclined auger 114, a motor 116, and an outlet 118, contained within housing 120. An inclined auger is preferably used over vertical or horizontal augers. It provides more even feeding. If a vertical auger is used for metering several issues need to be overcome. One is that when a vertical auger stops the material slides or leaks back down the auger flighting and then there is a delay in the material flow when it is started back up. Also to get flow at normal speeds the product needs to be pushed to the sides of the auger tube by centripetal force to provide the friction needed for the flighting to move the material. This requires more power and is non-linear in flow rate as the speed of the auger increases resulting in adjustment of flow accuracy issues.

Use of a horizontal auger is generally preferably over a vertical auger. However, an inclined auger is most preferred because in non-fixed positions, i.e. when used in field applications, the variations of flow with a horizontal auger are greater than with an inclined auger. The inclined auger is typically about 15 to 30 degrees. When the auger is tilted in a downhill position there is a greater variation in flow than if the auger is always in an above level flow. Also, with an inclined auger more product at the auger end for a quicker flow after the auger has started from an off position and material is kept from leaking past the end flighting during the off time. With a solenoid system, there is a pulsing effect associated with the dispensing of granules in association with the cyclic operation of the solenoid meter. This is greatly reduced with an auger system as a consequence of the rotation of the auger and the constant ratio of the auger fluting. While some degree of pulsing still exists with the inclined auger meter, to the naked eye, it appears as if the product is being dispensed in a non-pulsed continuous flow. The degree of reduced pulsing is confirmed by the fact that supplement diffusion isn't required with the inclined auger meter versus the requirement for the internal double-helix diffuser or an external in-hose diffuser when attempting to dispense low rates (less than 3.0 dry ounces per 1,000 feet of row) with the solenoid meter.

The agricultural product metering system may utilize a liquid pump if liquid agricultural products are utilized. A variety of suitable liquid pumps used in standard agricultural practices may be used such as centrifugal pumps, piston pumps, and diaphragm pumps, for application of agricultural fluids.

Figure 7:
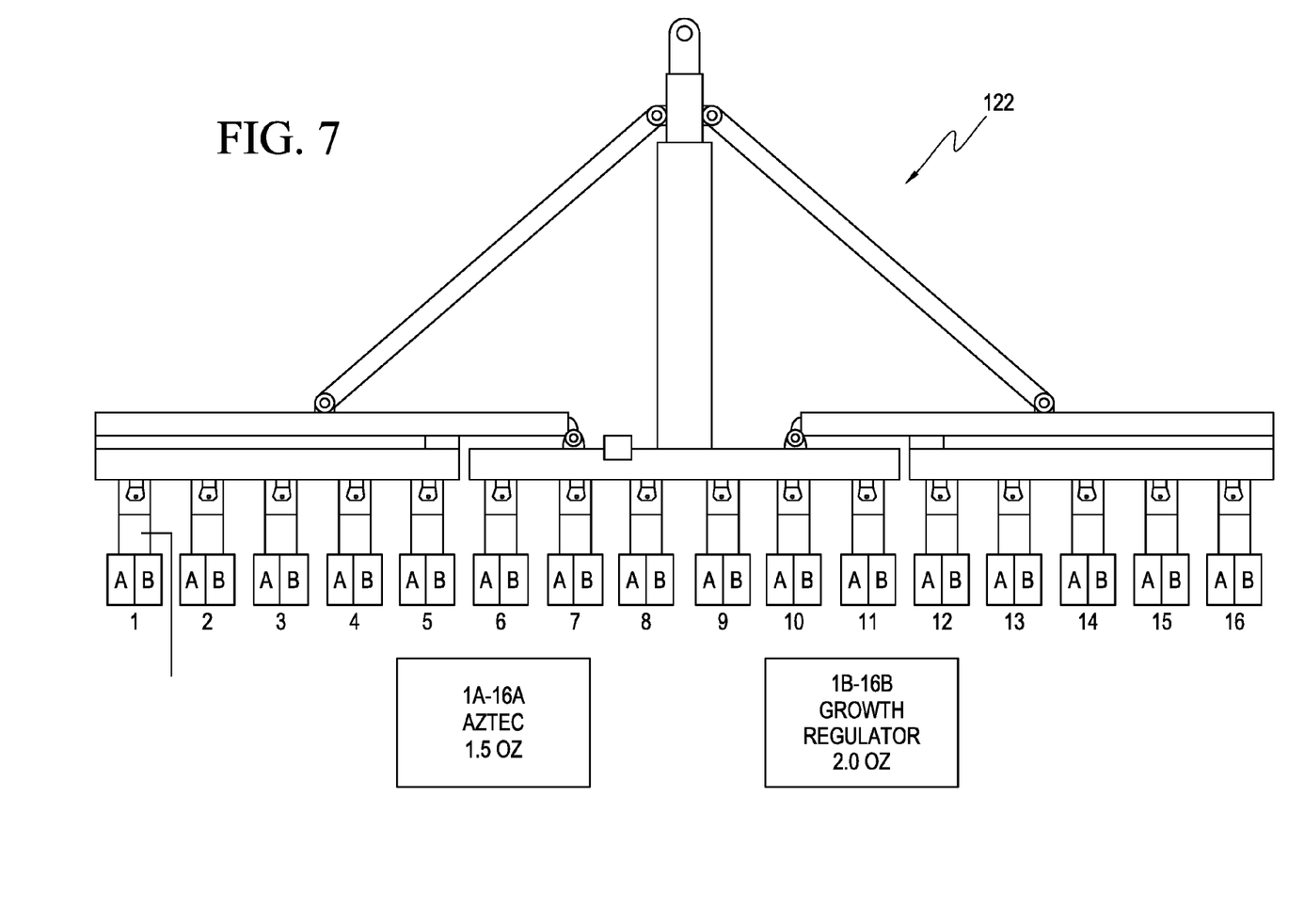
FIG. 7 is a diagrammatic illustration of a planter in accordance with the principles of the present invention showing utilization of sets of agricultural product containers, shown side by side, mounted on a 16-row corn planter.

Referring now to FIG. 7, a planter 122 in accordance with the principles of the present invention is illustrated, showing utilization of 16 sets A, B of agricultural product containers, shown side by side. This figure shows the container sets A, B mounted on the rear of the 16 row crop planter 106. Aztec® pesticide (containers 1A-16A) is for controlling insects. Growth regulator (containers 1B-16B) is for enhancing plant growth. Thus, there are multiple meters per row, each meter being operatively connected to a product container of a set of product containers.

Applying product directly into the furrow during the planting process in lieu of pre-treating the seed with a crop input product can protect the seed and the resultant young seedling, while eliminating the crop input dust that escapes into the atmosphere as a consequence of the crop input being abraded off of the seed and blown into the air when air is used to transport seed from a seed hopper on the planter to the individual row unit that delivers the seed into the seed furrow. Also, applying the crop input into the furrow while planting gives the farmer flexibility to prescriptively apply crop inputs at the optimum rate and to only those locations within a field that are identified prior to planting, that are likely to respond most favorably to the input. This is versus the requirement to uniformly apply the same products at a consistent rate to all locations in a field when delivery of the input is linked to the presence of the input on the seed as a consequence of the seed having been treated with the input(s) prior to planting. Another use is relative to soil inoculants. Legume crop seeds are frequently inoculated with nitrogen-fixing bacteria many weeks prior to planting. These bacteria must be alive in order to fix nitrogen from the atmosphere, but unfortunately, a high percentage of the inoculating organisms die during the time that passes between applying the inoculant to the seed and planting time. Dispensing nitrogen-fixing inoculants and/or other living biological crop inputs into the soil at planting time may substantially reduce the total amount of product used because the products can be stored under better living conditions for the organisms until such time as they're dispensed into the soil.

Also, split-planter mapping has shown that when two different soil insecticides are applied at planting time one insecticide may provide a different yield response from the other insecticide. This is because some insecticides have differing efficacy levels against different insect species. The population of insects may vary according to soil types and conditions. Corn nematodes frequently cause more damage in sandy soils and soybean nematode populations can vary according with soil pH. Other soil insect pest populations can vary according to the amount and type of organic material and soil moisture in the field. A planter equipped with this invention, utilizing externally supplied georeferencing information can apply different insecticides and/or other products at prescriptive dose rates to the specific locations within a field in order to optimize the performance of the crop in the applied areas, while minimizing the expense associated with applying all crop inputs at a constant rate throughout an entire field when it's known that not all treated areas will respond uniformly. Planters already have the capability to change hybrids or varieties as soil types and characteristics change and this invention facilitates doing the same with crop inputs which are applied while planting.

Thus, the planter can be equipped with several different products, with each product being applied as needed to site-specific locations. Also, the products can be applied several different ways as needed. There are several different placement options available for placing the crop input product(s) into or onto the soil. For example, the present invention may include in-furrow placement and/or banding above the furrow. As discussed, the system can run, for example 48 row units, with multiple products being applied at varying rates from one row to the next, and throughout the entire length of each row. All products can be applied together at uniform or consistent rates, or they can be prescriptively applied so that different products and/or rates are applied to different areas. For example, one product can be applied in-furrow and another placed in a band. Also, sometimes multiple products such as seed treatments for disease and inoculants are applied to seeds at the same time but there is limited time for planting because they affect each other and will not be active unless planted within a specific time. Applying products at planting gives the farmer more flexibility.

Figure 8:
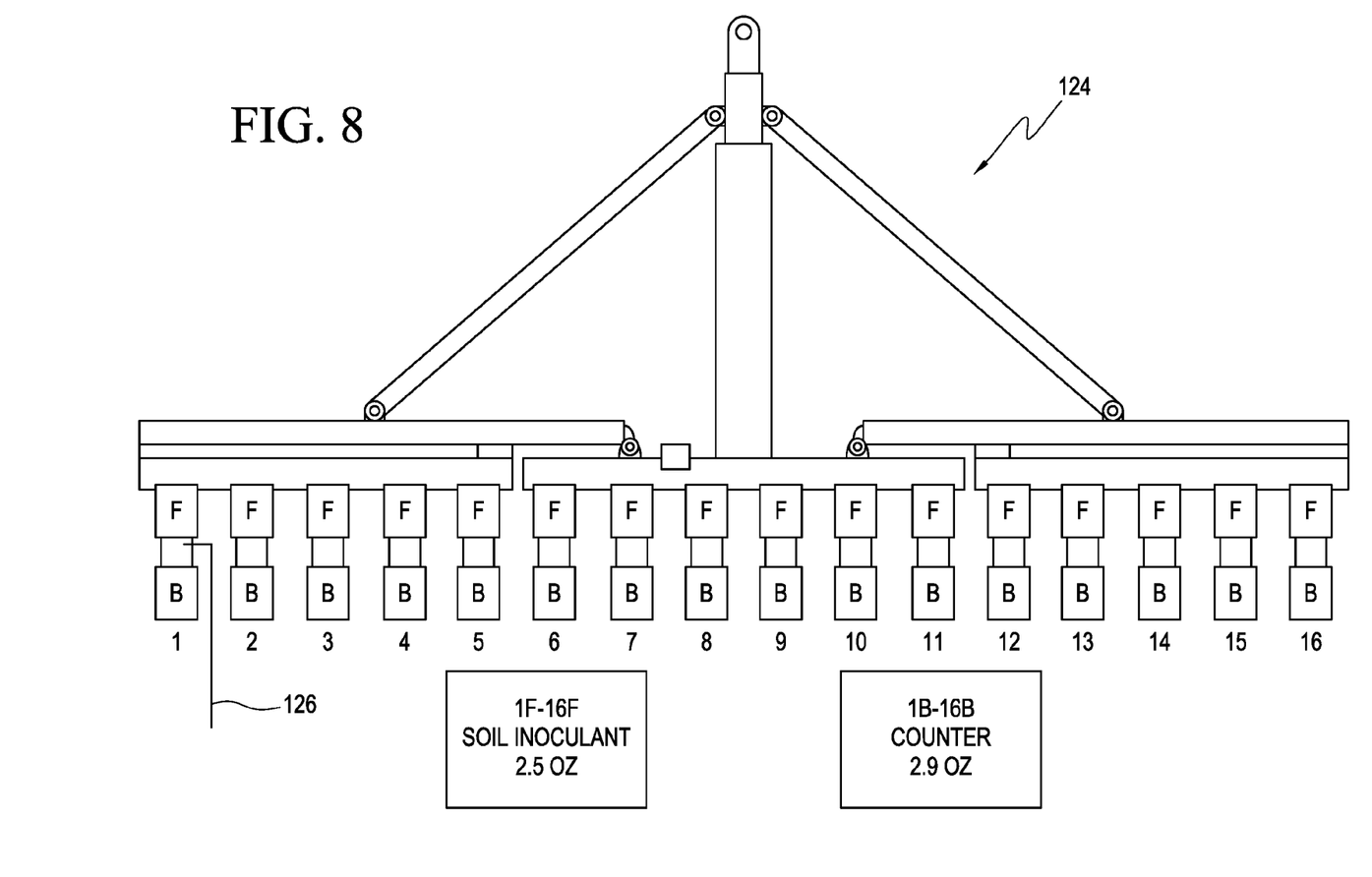
FIG. 8 is a diagrammatic illustration of a planter in accordance with the principles of the present invention showing utilization of sets of agricultural product containers, each set including one container mounted in front of a seed meter assembly and one container mounted behind the seed meter assembly.

Referring now to FIG. 8, a planter 124 in accordance with the principles of the present invention is illustrated showing utilization of 16 sets F, B of agricultural product containers, each set F, B including one product container F mounted above or near the corresponding seed meter assembly 126.

Although FIGS. 7-8 only show two containers in a set of containers, a set may include numerous product containers. Higher crop prices also make multiple treatments more economical. The present invention provides application of multiple products to the same row at planting time. As future agricultural science grows more products will become available. The present invention has the capability to apply multiple crop input products at planting according to soil type, insect pressure, soil fertility, disease pressure and/or other plant requirements.

Additional embodiments of the present invention may include an in-meter diffuser that receives foreign material and lumps in order to prevent the metering apparatus from becoming clogged. In certain embodiments a pulsing electrical valve and/or a gate or door is utilized which opens or closes in order to permit the flow of chemical products. U.S. Pat. No. 7,171,913, incorporated by reference herein, discloses a diffuser and pulsing electrical valve.

In certain embodiments, the effectiveness of soil-applied chemicals can be increased at planting time by inducing seed and chemical granules into the same seed dispensing tube, delivering the chemical products and a seed in close proximity with each other in such a way that the chemical products are dispersed with the seed as the seed passes through the seed dispensing tube. For example, U.S. Pat. No. 6,938,564, entitled "Method and System for Concentrating Chemical Granules Around a Planted Seed," issued to Conrad, et al., discloses a system in which chemical granules are dispensed through a granule tube into a seed dispensing tube, where the granule tube is connected to the seed dispensing tube at a location above a lower opening of the seed dispensing tube, and where the lower opening of the seed dispensing tube is covered with a brush. A seed is dispensed through the seed dispensing tube. The brush holds chemical granules within the seed dispensing tube such that chemical granules accumulate within the seed dispensing tube, and the brush allows a seed and accumulated chemical granules to pass through the lower opening when the seed is dispensed via the seed dispensing tube.

Thus, precision placement of chemical around the seed can optimize chemical utilization. In certain embodiments the agricultural product may be dry and in others it may be liquid.

Figure 9:
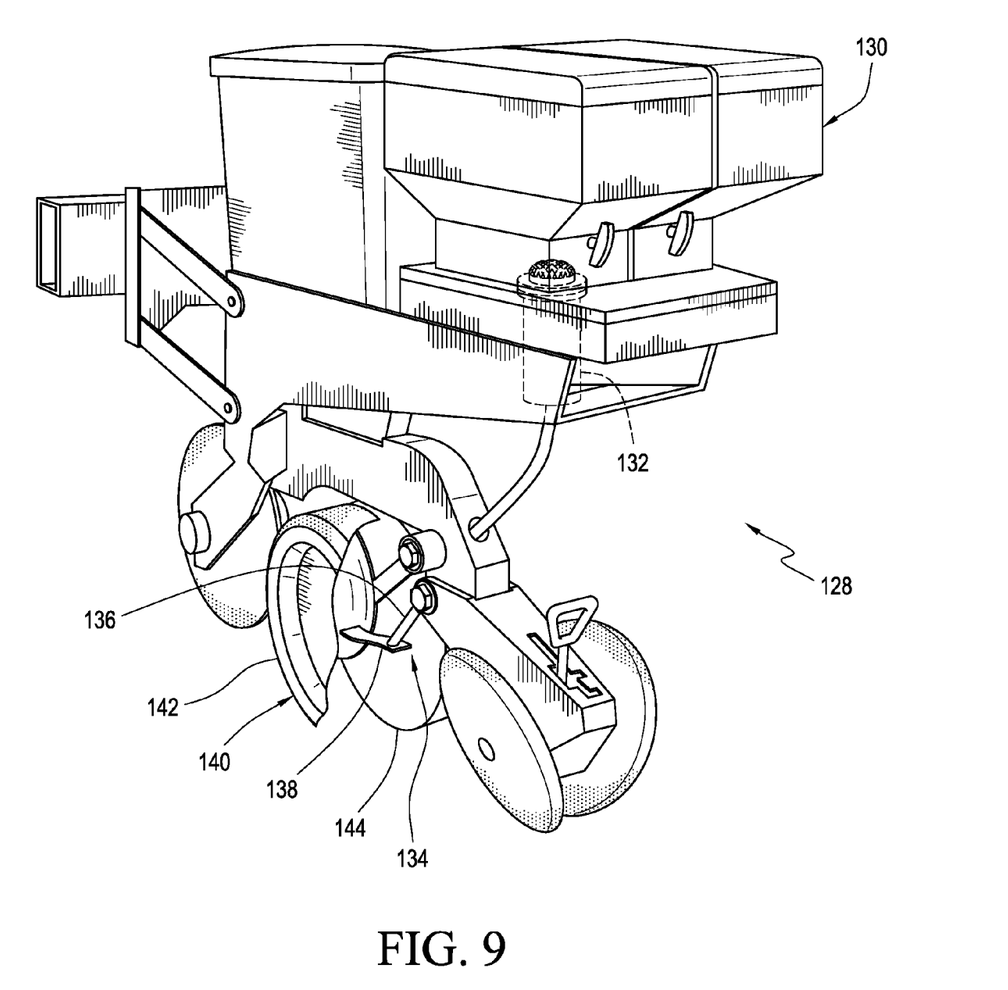
FIG. 9 is a low application rate dispensing planter row unit specifically designed for dispensing agricultural products at a low application rate, a depth control wheel being shown partially cutaway to expose a rear mounted placement tube.

Referring now to FIG. 9, a perspective illustration of an embodiment of a low application rate dispensing planter row unit is illustrated, designated generally as 128, which dispenses agricultural products at a low application rate. The low rate dispensing planter row unit 128 includes rigid product containers 130 containing low application rate agricultural products. The rigid product containers being utilized are designed to maintain product integrity during shipping and storage. A preferred rigid container is formed of high-density polyethylene (HDPE). The density of high-density polyethylene can range from about 0.93 to 0.97 grams/centimeter3. An example of a suitable rigid container is high density polyethylene formed of Mobil™ HYA-21 HDPE or equivalent material. It preferably has a wall thickness of between about 0.17 to 0.28 inches. The low application rate is defined as a rate below 3 ounces dry weight per 1000 feet of row.

In the past, pallets of bagged product were stacked four or five high for months in the warehouse. A common procedure was to drop the bag on the ground or floor to break them up if they seemed rigid. Standard application equipment has rotors to help grind up lumps. But this is only moderately effective at rates commonly in use today because the control orifices in the bottom of present meters are large enough to pass some lumps. Lumps still get caught in the orifices until the rotors forced them through. At lower rates the control orifice has to be small enough to control the flow however this orifice size is too small for free flow so the product has to be forced through the control orifice by the rotor movement. Any lumps make the plugging issues worse. Also, a major problem with paper bags is that cutting them, tearing them open, or other opening techniques causes small pieces of paper to enter the application system which can cause more plugging issues. Also, filling the planter equipment from non-closed systems with open lids allows foreign material such as dirt, corn residue, to enter the system, causing plugging. This is especially problematic on windy days.

The utilization of rigid product containers obviates the problems mentioned above.

Low application rate meter devices 132 operatively connected to the rigid product containers 130 are configured to dispense the agricultural products from the plurality of rigid product containers 130. As used herein, the term "low application rate" is defined as a rate below 3 ounces per 1000 feet of row.

When the weight of the inert ingredients (i.e. carrier) is lowered while the weight of the active ingredients is maintained approximately constant, then the consistency is maintained within control parameters and pest damage is also maintained within acceptable parameters.

Granules used as carriers may include, for example, the following:

Amorphous silica—bulk density in a range from about 0.160 to 0.335 g/mL,

Biodac® carrier—bulk density in a range from about 0.64 to 0.79 g/mL,

Clay—bulk density in a range from about 0.40 to 1.12 g/mL,

Sand—bulk density in a range from about 1.6 to 2.1 g/mL.

Granules loaded with chemicals will typically have a bulk density greater than the above values by about 10 to 30%.

The granules used as carriers may have sizes, for example, with diameters of from about 50 microns (fine sand, silica) to 4000 microns (coarse sand). Clay granules are typically around 500 microns, Biodac® granules are typically around 2500 microns.

A typical clay granule weighs from about 0.07 to 0.09 mg. A typical Biodac® granule weighs around 0.2 mg. A silica granule weighs from around 0.02 mg to 0.05 mg. A sand granule can weigh up to about 5 mg (coarse).

One example of a granule used as a carrier has a bulk density of 0.866 g/mL, an average granule size of 510 microns and an average granule weight of 0.082 mg.

The agricultural products may be insecticides or a wide variety of other crop enhancement agricultural products such as fungicides, plant growth regulators (PGRs), micro-nutrients, etc.

Most current meter designs have a moving rotor in them that acts as a shut off device and is constantly spinning the product inside the insecticide hopper. As the application rate is reduced the amount of granules that are ground up and therefore the application rate is affected. If a low application rate is used the meter orifice may be smaller than the free flow rate for the granules and will result in more grinding and an uneven product flow. Also, at turnoff, the meter paddle forms a pool of product around the orifice that flows out as the planter turns around at end rows. John Deere & Company and Kinze Manufacturing have made modifications to reduce this effect at rates in use today but these modifications would not be effective at the low application rate indicated here.

In one embodiment, the low application rate meter devices 132 have larger orifices than previous conventional meter devices so they can free flow at lower rates. Preferably, the orifice diameter is in a range of 0.20 inch to 0.50 inch. An example of such a low application rate meter device is embodied in the SmartBox Dispensing System which has an orifice diameter of 0.25 inch to 0.50 inch depending on the rate of the product used. (The orifice is referred to above with respect to FIGS. 2 and 5 as an aperture.) The orifice diameter must be large enough to deliver more than the free flow of the intended product. The pulsing of the meter is one way to regulate the application rate of the product.

The low rate dispensing planter row unit 128 includes precision placement equipment operatively connected to the low rate meter devices to place the low usage rate agricultural products in the desired locations for efficient activity of the agricultural products. As shown in FIG. 9, such precision placement equipment may include, for example, a placement tube assembly 134. Thus, the low rate meter devices and the precision placement equipment dispense the agricultural products at an optimized efficiency.

In the embodiment illustrated in FIG. 9, the placement tube assembly 134 includes an elongated placement tube 136 connected to a foot 138. The foot 138 keeps the elongated placement tube 136 lined up with the depth control wheel assembly (also referred to above as a "depth wheel assembly") 140. Each placement tube assembly 134 is preferably fabricated from stainless steel. Use of stainless steel prevents corrosion from affecting placement or plugging. The placement tube assembly 134 shown in FIG. 9 is adapted to be utilized with a John Deere planter, as shown in this figure. It is rear mounted. Thus, each placement tube assembly 134 is mounted for placement of product in-furrow between each depth wheel 142, 144 of the depth control wheel assembly 140 of the planter.

Environmental Benefits of this Technology

Unlike other systems, this system enables the user to apply crop protection and other products as needed, where needed with unprecedented accuracy and precision. Environmentally speaking, the benefits are many and overall may reduce unnecessary chemicals into the environment as well as strategically place chemical inputs required for efficient crop production in specific rows, parts of rows or areas of the field where they are needed.

(Crop production means crops grown for human or animal food, fiber, or animal nutrition, or for esthetic value, such as ornamental woody or herbaceous plants, turf-grasses or other cultivated plants.)

First, enabling the user to vary the amount of product by row by georeferenced point greatly reduces the likelihood of over-application and targets only those areas requiring a specific crop input. In other words, while prior systems (which can be as many as 64 rows wide) deposit the same amount of material per row at the same time, uniformly across the field, this system will permit the user to follow a customized dispensing pattern, row by row, foot by foot, for each crop input. If, for example, rows 1-5 require more plant nutrient, while rows 10-15 require less, this system can tailor the application to accommodate the actual need, rather than applying the higher or uniform rates to all rows. This system also allows a reduction of an input chemical where mapping or pest populations may indicate little or no need for a specific chemical in a row, multiple rows or section of a field. As a result, in many cases, this system will reduce the amount of crop input to be used per acre.

Second, unlike other systems, which apply one product per row in-furrow, this system applies multiple products per row, in furrow or across the seed furrow. In order to apply more than one product to a field, current systems would require the user to make multiple passes through the same field (applying input A, then input B, etc.) at a uniform rate of application. This system enables the user to apply multiple products in one-pass. In reducing the number of times the planter must cross the field, this system effectively reduces the user's carbon footprint by reducing both chemical input and energy powered equipment across the field in multiple trips.

Third, in current systems, only certain crop inputs are packaged and dispensed through closed delivery systems. Closed delivery systems reduce or eliminate exposure to the operator as well as non-target organisms or the environment. By contrast, in this system, products (whether insecticides, fungicides, nutrients, fertilizers or other inputs) are preferably pre-packaged in closed containers and dispensed in a closed manner; these inputs are neither handled by the worker nor exposed to the open air in proximity to the worker. Thus, with this system, there is a higher degree of worker safety.

Fourth, with this system, not only are workers shielded from crop inputs in the open air, but pollinators are as well. Seed treatments can result in dust or residues in the open air or on the surface of the field. With the system of the present invention, the crop inputs are deposited from closed packaging directly into the furrow which, in turn, is sealed as the planting equipment completes its pass over the spot of deposition. This poses far less risk of generating any dust or residue above ground, where pollinators may be present.

Fifth, unlike current systems, the present system features packaging with factory-installed, embedded RFID tags which will enable the grower to dispense the material only if it was packaged by the manufacturer/formulator. This system not only gives the grower assurance that the contents of each package are genuine, but also prevents third parties from tampering with the packaging and, for example, refilling them with unauthorized or possibly unregistered material.

Sixth, this system facilitates the use of packaging that can be reused. In one embodiment, the grower will return empty containers to the distributor/manufacturer who, in turn, will take action to ensure that the package is refilled and that package is reequipped with a new/active RFID tag. By recycling these containers, growers will avoid the unnecessary generation of waste and the additional burden on landfills.

This system may allow growers more flexibility to choose untreated seed. The majority of row crop seed is indiscriminately treated before planting with crop protection products for very early season pest control. Treatment is made upstream by seed suppliers in the seed distribution channel. Farmers have little choice in choice of seed treatment chemicals on their seed. This system would allow farmers to request seed with no pretreatment in order to farm organically or choose only the early season pest protectants or growth enhancers they wish to have. For organic farming requirements, growers could choose products that fit organic farming requirements.

There is a nationwide shift toward earlier planting into cooler and wetter temperate soils. These conditions slow plant emergence and early growth which gives the seed and seedling greater exposure to early-season seed and root pathogens (P. Esker and S. P. Conley, 2012. Crop Science. 52(1):351-359). This system would allow specific chemicals to be delivered at planting for earlier planted crops where specific insect and disease control products are needed.

Growers typically overseed on many crops due to compensate for biotic and abiotic plant losses. Recent studies have pointed to lower seeding rates in soybeans and other crops to provide a higher return on investment for farmers. This system would allow tailoring a package of nutrients, plant protection products and plant growth regulators unique to rows, sections of rows or fields to allow optimal seeding rates to improve acre returns. (P. Esker and S. P. Conley. 2012. Crop Science. 52(1):351-359).

This system would additionally allow prescribed application of plant growth regulators at planting to hasten germination and improve seedling growth in areas of production where rain on certain soil textures can cause soil crusting and negatively affect plant germination.

With the present system the RFID tag informs the system of the net contents of each container. The system calculates and records on an on-going/constant basis, the quantity of product that has been removed from each container. (The means of calculating the quantity of product removed is a function of the number of times the auger rotates and/or the number of times and for what duration of time and at what pressure, the liquid dispensing equipment is operated.) Once the system determines that the container for a given receptacle is empty, the system will disallow additional product to be dispensed from that receptacle. This will prevent operators from cutting a hole in the top of the product container for the purpose of applying a greater quantity of product through the container than was originally inserted into the container when it was filled by the product manufacturer.

Although the utilization of RFID tags to provide information of the net contents of each container, as discussed above, is particularly advantageous to the system of FIG. 1, such a utilization of RFID tags is adaptable to many other applications, such as, for example, direct injection spray systems.

The present invention has been discussed above relative to crops; however, the inventive concepts herein are not limited to crop production. These principles can be used for various soil dispensing implements that dispense soil input products from multiple meters in a soil area. The meter controller module operatively connected to the prescriptive control module is configured to utilize the specific prescriptive rate information to individually control multiple meters of a group of meters in the soil area, to simultaneously dispense soil input products at specific prescriptive rates at georeferenced locations throughout the soil area.

Other embodiments and configurations may be devised without departing from the spirit of the invention and the scope of the appended claims.

The invention claimed is:

1. A system for dispensing crop input products from multiple meters per crop row, comprising:
   a) a georeferencing module configured to receive and process georeferenced location information;
   b) a prescriptive control module configured to receive the processed georeferenced location information from the georeferencing module and utilize the georeferenced location information to generate specific prescriptive rate information for individual meters in the field; and,
   c) a meter controller module operatively connected to the prescriptive control module, configured to utilize said specific prescriptive rate information to individually control multiple meters per crop row, to simultaneously dispense crop input products at specific prescriptive rates at georeferenced locations throughout the field, wherein RFID tags positioned on crop input product containers operably connected to the meter controller module inform the system of the net contents of the crop input container and the system calculates and records on an on-going/constant basis, the quantity of crop input product that has been removed from each crop input container.

2. The system of claim 1, wherein said meter controller module is configured to control meters comprising dry meters for dispensing dry crop input products, liquid meters for dispensing liquid crop input products, and/or combinations of dry and liquid meters.

3. The system of claim 2, wherein said dry meters comprise auger meters and/or solenoid meters.

4. The system of claim 2, wherein said dry meters comprise inclined auger meters and/or solenoid meters.

5. The system of claim 1, wherein said meter controller module is configured to simultaneously control up to 8 meters per crop row.

6. The system of claim 1, wherein said meter controller module is configured to simultaneously control up to 216 meters.

7. The system of claim 1, further comprising an RFID tag reading device operably connected to the meter controller module, wherein an individual RFID tag reading device is operatively connectable to each individual RFID-tagged crop input product container.

8. A method for dispensing crop input products from multiple meters per crop row, comprising:
   a) receiving and processing georeferenced location information utilizing a georeferencing module;
   b) receiving the processed georeferenced location information from the georeferencing module and utilizing the georeferenced location information to generate specific prescriptive rate information for individual meters in the field utilizing a prescriptive control module; and,
   c) using a meter controller module operatively connected to the prescriptive control module to utilize said specific prescriptive rate information to individually control multiple meters per crop row, to simultaneously dispense crop input products comprising low usage rate crop enhancement products at specific prescriptive rates at georeferenced locations throughout the field.

9. A system for dispensing crop input products from multiple meters per crop row, comprising:
   a) a georeferencing module configured to receive and process georeferenced location information;
   b) a prescriptive control module configured to receive the processed georeferenced location information from the georeferencing module and utilize the georeferenced location information to generate specific prescriptive rate information for individual meters in the field;
   c) a meter controller module operatively connected to the prescriptive control module, configured to utilize said specific prescriptive rate information to individually control multiple meters per crop row, to simultaneously dispense crop input products at specific prescriptive rates at georeferenced locations throughout the field; and,
   d) an RFID tag reading device operably connected to the meter controller module, said RFID tag reading device being operatively connectable to an RFID-tagged crop input product container, wherein
      said RFID tag reading device is configured to read RFID information retrieved from the RFID-tagged crop input product container to ensure that the crop input product installed at a specific row location conforms to a crop input product description associated with that specific row location during a meter control module set-up;
   wherein when crop input product is put into the product container the contents are written to an RFID tag positioned on the RFID-tagged crop input product container, and when the crop input product is dispensed, as-applied information being recorded, and transmitted to a data aggregator providing data aggregation, wherein the data aggregation ensures that when multiple fields are treated by multiple operators with the same crop input product, the as-applied information for that crop input product is recorded in a consistent manner across all the fields so-treated.

10. A system for dispensing crop input products from multiple meters per crop row, comprising:
   a) a georeferencing module configured to receive and process georeferenced location information;
   b) a prescriptive control module configured to receive the processed georeferenced location information from the georeferencing module and utilize the georeferenced location information to generate specific prescriptive rate information for individual meters in the field;
   c) a meter controller module operatively connected to the prescriptive control module, configured to utilize said specific prescriptive rate information to individually control multiple meters per crop row, to simultaneously dispense crop input products at specific prescriptive rates at georeferenced locations throughout the field,
      wherein a planter contains a master row and a plurality of slave rows, the master row having a plurality of master receptacles and the plurality of slave rows having a plurality of slave receptacles, each of said plurality of master receptacles and plurality of slave receptacles having an RFID tag reading device connected thereto, wherein each RFID tag reading device is operably connected to the meter controller module, and each RFID tag reading device is operatively connectable to an RFID-tagged crop input product container,
      wherein in the event a crop input product container is inserted into a slave receptacle, and the RFID tag information of that inserted crop input product container does not conform to the RFID tag information associated with a corresponding master receptacle to that slave receptacle, then the meter control module will disallow application of the crop input product and will notify the human operator via an error message on a graphical user interface of the meter control module, that the inserted product container has been disallowed.

11. The system of claim 10, wherein when application of the crop input product is disallowed, the meter controller module will not dispense crop input product from any of the other meters in the system until a correct product container is installed, or until that specific non-conforming crop input product container has been selectively disabled through the meter controller module by the human operator.

\* \* \* \* \*